United States Patent [19]

Khan

[11] Patent Number: 5,602,699

[45] Date of Patent: Feb. 11, 1997

[54] GIMBAL ASSEMBLY OF A MAGNETIC HEAD SUSPENSION

[75] Inventor: Amanullah Khan, Pleasanton, Calif.

[73] Assignee: Read-Rite Corporation, Milpitas, Calif.

[21] Appl. No.: 496,581

[22] Filed: Jun. 29, 1995

[51] Int. Cl.⁶ ........................................ G11B 5/60
[52] U.S. Cl. ........................................ 360/104
[58] Field of Search ........................ 360/140, 103

[56] References Cited

U.S. PATENT DOCUMENTS

| 5,377,064 | 12/1994 | Yaginuma et al. | 360/104 |
| 5,465,182 | 11/1995 | Ishikawa | 360/75 |

FOREIGN PATENT DOCUMENTS

| 2-198078 | 8/1990 | Japan | 360/75 B |
| 5-205414 | 8/1993 | Japan | 360/75 B |
| 5-314694 | 11/1993 | Japan | 360/75 B |

*Primary Examiner*—Robert S. Tupper
*Attorney, Agent, or Firm*—Nathan N. Kallman

[57] ABSTRACT

A gimbal assembly of a magnetic head suspension includes a flexure having a dimple. A slider carrying a magnetic transducer is attached to the flexure and in contact with the dimple. The flexure has a polygon shape with cutouts defining a plurality of internal and external strut members. Each strut member is elongated in shape with a substantial uniform width. The flexure has a wider midsection than its end sections. When the slider flies above the disk surface over a thin air film, pivoting against the dimple, the flexure provides sufficient agility for the slider to accommodate the uneven topology of the disk surface, yet the flexure is enough stiff to resist any physical deformation that could be caused by the rapid movements of the actuator arm carrying the gimbal assembly.

7 Claims, 2 Drawing Sheets

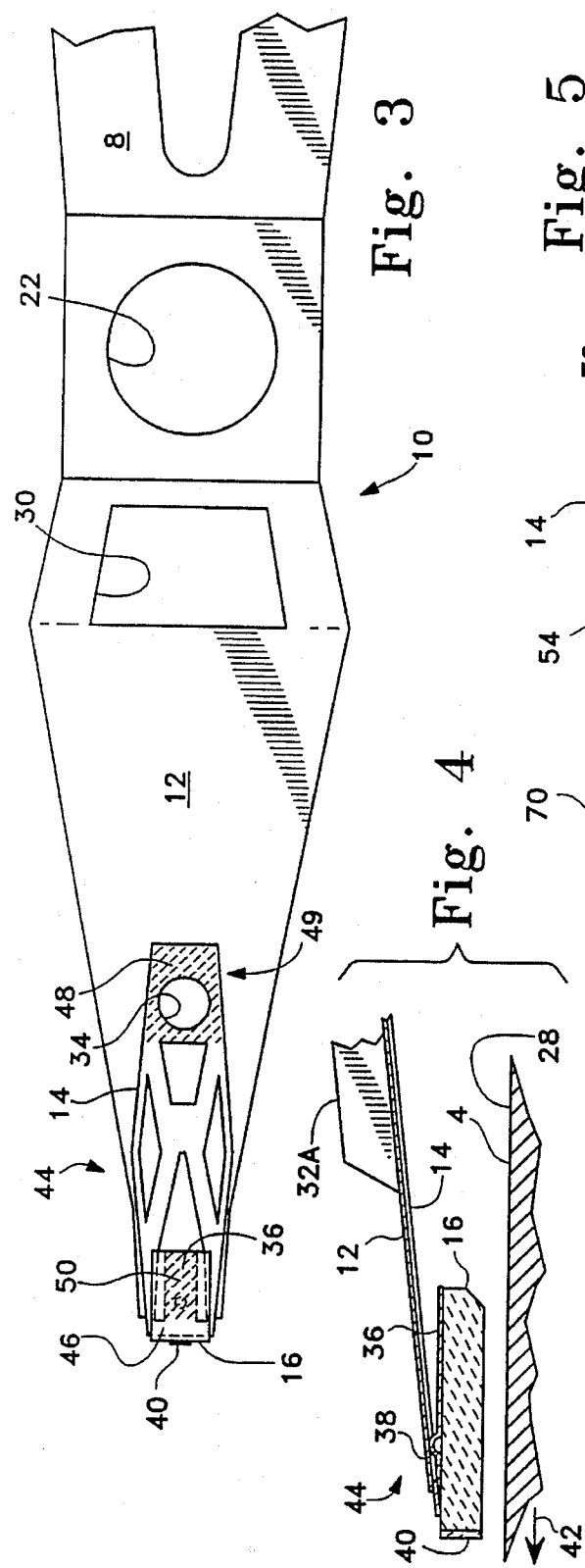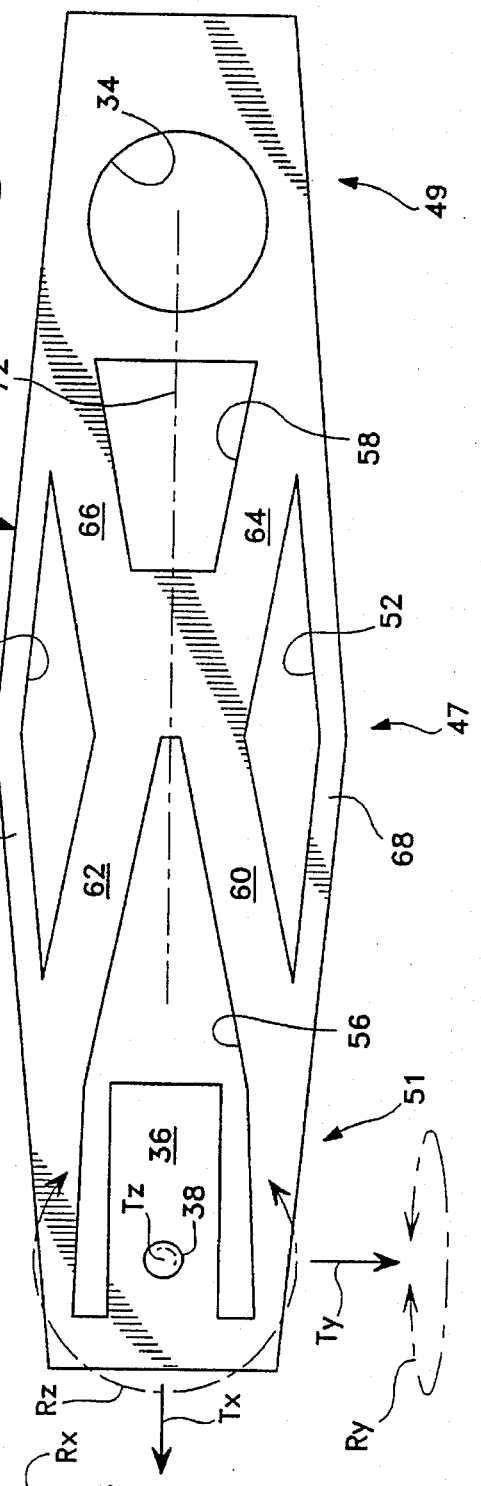

GIMBAL ASSEMBLY OF A MAGNETIC HEAD SUSPENSION

CROSS-REFERENCE TO COPENDING PATENT APPLICATION

Copending U.S. patent application Ser. No. 08/418,451 filed Dec. 19, 1994, on behalf of the same inventor, and assigned to the same assignee, discloses a magnetic head suspension assembly which incorporates, inter alia, a load beam and a flexure that supports a slider. The subject matter of the copending application is incorporated herein by reference. The present invention is directed to an enhanced gimbal with decrease in the roll and pitch stiffness while maintaining the lateral stiffness.

FIELD OF THE INVENTION

This invention relates to a magnetic head suspension and in particular to a flexure design of a gimbal assembly of a magnetic head suspension.

BACKGROUND OF THE INVENTION

Disk drives typically include a stack of spaced apart, concentric disks mounted on a common shaft, and an actuator arm assembly encased within a housing. The actuator arm assembly comprises a plurality of arms extending into spacings between the disks. Mounted on the distal end of each arm is a resilient load beam which in turn carries a miniaturized gimbal assembly. Included in the gimbal assembly is a slider pivotally attached to a flexure. A magnetic transducer, employed to interact with the disks, is affixed to the slider.

During the data seeking mode, the disks spin at a high speed about a common shaft. The actuator arm assembly moves the arms toward selected data tracks of the disk. The aerodynamics of the moving air between the slider and the disk surface provide sufficient buoyancy to suspend the slider above the disk surface. On the other hand, the spring force of the resilient load beam pushes the slider toward the disk surface. As a result, the slider flies over the disk surface at a very small spacing, which is called the flying height of the slider.

A lower flying height provides many advantages. First, occurrence of data error is substantially reduced as data can be more reliably written onto or retrieved from the disks during the write and read modes, respectively. The lower flying height enables the use of narrower data track widths, which in turn allows higher data storage capacity.

However, there are major obstacles associated with reducing the flying height of the slider. To begin with, the topology of the disk surface, though highly polished, is not at all uniform at microscopic scale. Moreover, the disk surfaces are not rotating about the common shaft at a perfectly perpendicular angle. A minute angular deviation would translate into varying disk-to-slider distances while the disk is spinning. For reliable data writing and reading, the slider has to faithfully follow the topology of the spinning disk, without impacting the disk surface. With a low flying height, this may not be an easy task.

A head gimbal assembly is normally employed to perform the aforesaid function of accommodating the disk surface topology. Basically, the gimbal assembly is designed to dynamically adjust the position of the slider to conform to the irregular disk surface while the disk is spinning. To this end, the flexure inside the gimbal assembly must be sufficiently flexible and yet stiff enough to resist physical deformation.

Various shapes and forms of the flexure have been proposed. One of such flexures is disclosed in Japanese Patent No. 2-18770, issued to T. Yumura, on Jan. 23, 1990. In Yumura, the flexure has parallel edges in the longitudinal direction. Near the edge boundaries, there is a pair of rectangular slots located at the distal end portion of the flexure. As arranged, the rolling and pitching actions are mostly confined to the distal end portion because the proximate end portion of the flexure comprises a sizable area of rigid material which is relatively unyielding. Moreover, the lateral stiffness is significantly weakened, as three parallel apertures separating four narrow strips are arranged in a row at the distal end portion.

The technological trend in disk drive manufacturing is toward miniaturization, and high performance with fast data seeking and writing time. As a consequence, sliders are shrunk down in size and the flying heights are made to be lower. To accommodate these stringent requirements, and for a slider to fly proximately close to the disk surface, the magnetic head suspension system must be, inter alia, low in roll and pitch stiffness and high in lateral stiffness.

SUMMARY OF THE INVENTION

It is the object of the invention to provide a magnetic head suspension arrangement having a gimbal assembly which is low in roll and pitch stiffness and high in lateral stiffness.

Another object is to provide a high performance gimbal assembly that is relatively inexpensive to manufacture.

In the preferred embodiment of the invention, a head gimbal assembly includes a flexure having a dimple. A slider carrying a magnetic transducer is attached to the flexure which is urged against the dimple. The dimple acts as a pivot point for the movement of the slider. The flexure of the preferred embodiment assumes a truss polygon shape having cutouts defining a plurality of internal and external strut members. Each strut member is elongated in shape and with a substantial uniform width. The flexure is also wider in the midsection than in the end sections. The flexure provides sufficient agility in various degrees of movement for accommodating the uneven topology of the disk surface while the slider is flying over the disk, and yet sufficiently stiff to resist any physical deformation that may be caused by the rapid movements of the actuator arm carrying the gimbal assembly.

These and other features and advantages of the invention will be apparent to those skilled in the art from the following detailed description, taken together with the accompanying drawings.

BRIEF DESCRIPTION OF THE DRAWINGS

FIG. 3 is a bottom plan view of the magnetic head suspension shown in FIG. 1;

FIG. 4 is a partial side view of the end section of the suspension taken along line 4—4 of FIG. 1; and FIG. 5 is a top plan view of the polygon-shape flexure, which forms a part of the gimbal assembly, having cutouts defining a plurality of internal and external struts.

DETAILED DESCRIPTION OF THE INVENTION

Figure 1:
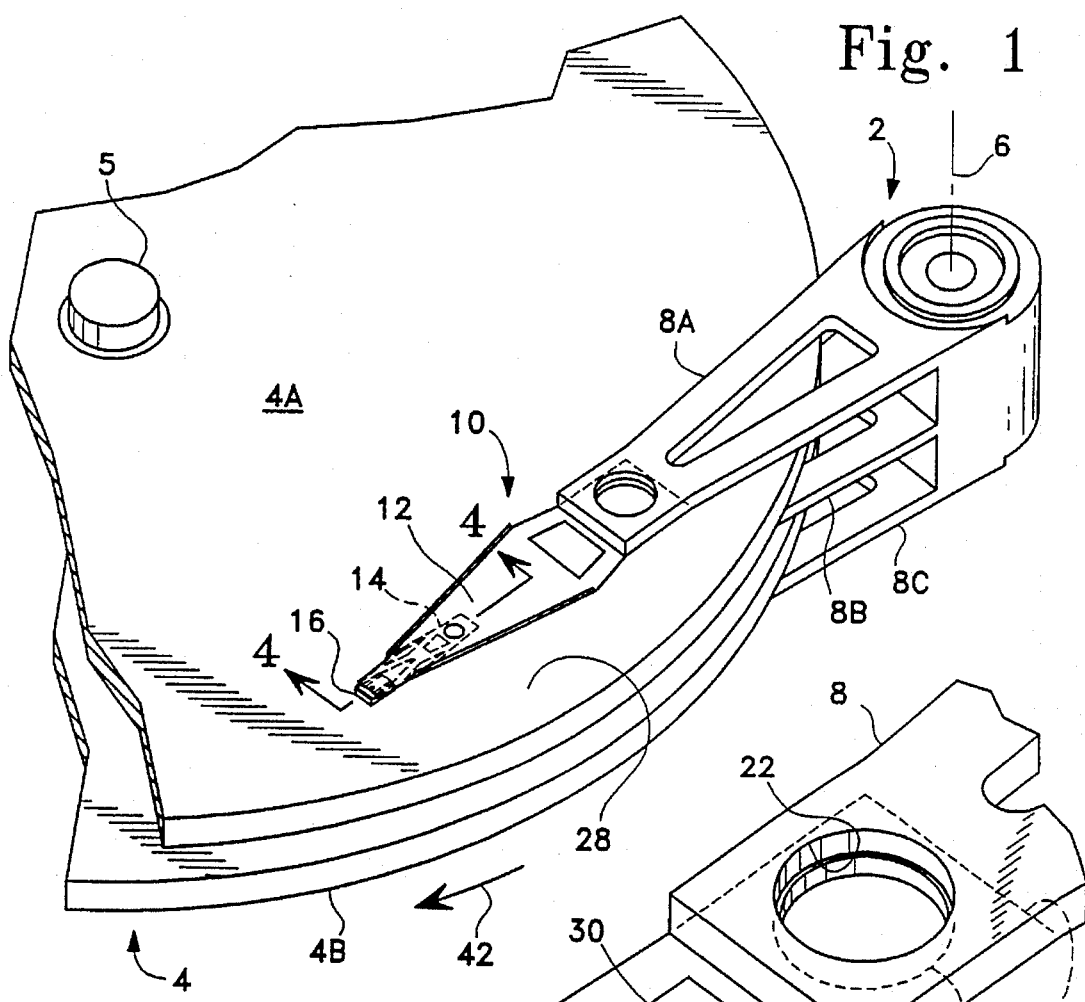
FIG. 1 is a fragmentary view of a disk drive having a magnetic head suspension which includes the gimbal assembly of the invention.

FIG. 1 shows a fragmentary view of a disk drive having an actuator arm assembly 2 and a stack of spaced apart disks 4 rotatable about a common shaft 5. The actuator arm assembly 2 is rotatable about an actuator arm axis 6. The arm assembly 2 includes a plurality of actuator arms 8A–8C which extend into the spacings between the disks 4A and 4B. Attached to each of the actuator arms 8A–8C is a magnetic head arrangement 10, which comprises a resilient load beam 12, a flexure 14 and a slider 16.

Figure 2:
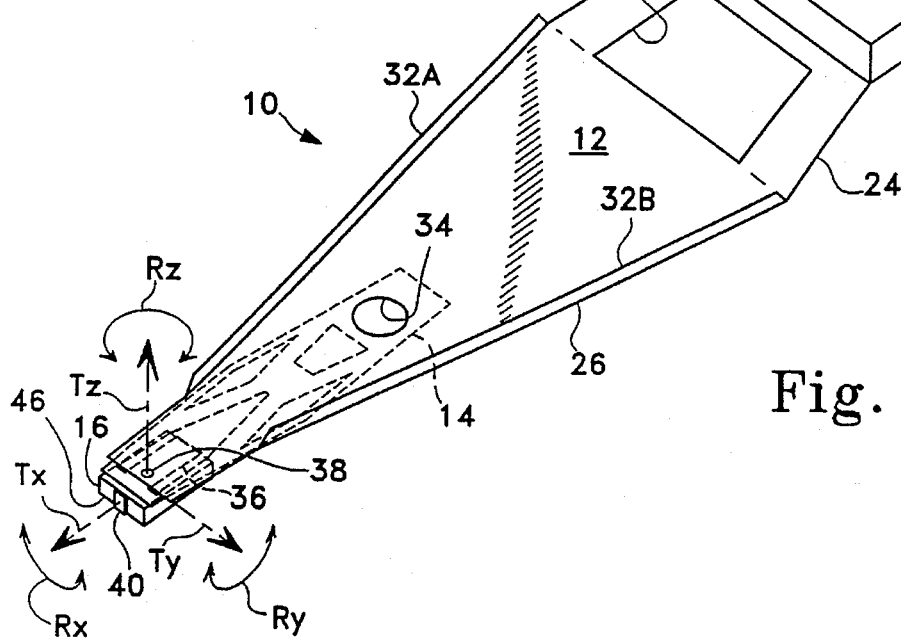
FIG. 2 is an enlarged perspective view of the magnetic head suspension of FIG. 1 showing the different types of movement of the slider carrying the magnetic head.

FIG. 2 shows the magnetic head suspension arrangement 10 in further detail. The load beam 12 includes a base section 18 having a boss 20 insertable into a hole 22 of the actuator arm 8. There is also a resilient section 24 located between the base section 18 and a protrusion section 26 of the load beam 12. The resilient section 24 is slightly bent with respect to the base and protrusion sections 18 and 26. The degree of bending determines the downward preload force of the slider 16 toward the disk surface 28. An aperture 30 is also provided in the resilient section 24. The size of the aperture 30 establishes the resilience of the load beam 12. The protrusion section 26 is normally made relatively rigid by a pair of ribs 32A–32B integrally formed along the edges of section 26.

Underneath the protrusion section 26 of the low beam 12 is the flexure 14. An alignment hole 34 in the protrusion section 26 is provided for the alignment of the corresponding hole in the flexure 14, thereby orienting the flexure 14 in a proper location. The flexure 14 is fixedly attached onto the beam arm 12 only in the area surrounding the alignment hole 34 via welding or gluing. The rest of the flexure 14 remains unattached to the load beam 12 and is free of physical constraint.

A finger portion 36 is integrally formed in the flexure 14. Fixedly attached to the finger portion 36 is the slider 16. Stamped in the finger portion 36 is a dimple 38 which is urged against the base of the load beam 12, and contributes to the gimbaling action. A transducer 40 is disposed at the rear edge of the slider 16.

FIG. 3 shows a bottom plan view of the magnetic head suspension 10 viewed from the air bearing surface (ABS) 46 of the slider 16. As mentioned before, the flexure 14 is partially fixedly attached to the load beam 12. Specifically, the proximate end portion 49 of the flexure 14 is attached to the load beam at the shaded area identified by the reference numeral 48. The rest of the flexure 14 is unattached and allowed to move freely to contribute to the gimbaling action. In a similar manner, the slider 16 is fixedly attached to finger portion 36 of the flexure 14 through the shaded area identified by the reference numeral 50.

With reference to FIG. 1, during normal operation, the disks 4 spin at high angular speed in the direction of the arrow 42 about the shaft 5. The aerodynamics of the moving air between the slider 16 and the disk surface 28 provides sufficient buoyancy to suspend the slider 16 above the disk surface 28. On the other hand, the spring force of the resilient load beam 12 coupled with the gram force of the slider 12 push the slider toward the disk surface 28. An equilibrium point is reached where the slider 16 flies over the disk surface 28 at a fixed distance. As mentioned before, the topology of the disk surface 28 is uneven. For data integrity and reliability reasons, the slider-to-disk distance has to be maintained at a constant value, irrespective of the irregularity of the disk surface. The gimbal assembly 44 serves this purpose.

FIG. 4 is a cross-sectional side view taken along line 4—4 of FIG. 1. FIG. 4 dissects the gimbal assembly 44 of this embodiment and exposes the relevant components in greater detail. The gimbal assembly 44 includes the slider 16 and the flexure 14 having the stamped dimple 38 contacting the bottom of the load beam 12. The moving air between the slider 16 and the disk surface 28 is of relatively high pressure. In essence, it is a thin film of air blanketing the disk surface 28 during normal operation. The gimbal assembly 44 must be of sufficient agility to accommodate the uneven surface contour of the disk surface 28 separated by the air film. The design of the flexure 4 is therefore of paramount importance. The flexure 14 must be flexible enough to maintain its agility in some aspects, and must also be stiff enough in other aspects in order to resist structural deformation caused by the swift arm movements.

With reference to FIG. 2, to properly design a gimbal assembly, the basic movements of the slider must be understood. Essentially, there are six degrees of freedom associated with the slider 16. They are, namely, three translational movements in the x, y and z directions identified respectively by labels Tx, Ty, and Tz; and there are three rotational movements about the x, y, and z axes identified respectively by labels Rx, Ry and Rz. Parameters Rx, Ry and Rz are also respectively called pitch stiffness, roll stiffness and yaw stiffness of the slider movement. Similarly, parameters Tx, Ty and Tz are called x-stiffness, y-stiffness and z-stiffness, respectively. In this specification, the parameter names "y-stiffness" and "lateral stiffness" are used interchangeably. The design goal for a gimbal assembly is to have flexible Ry, Rx and Tz, but stiff Rz, Tx and Ty.

The design of a magnetic head gimbal assembly does not allow the implementation of a complex large mechanism as there is not much space and weight carrying capacities above a moving disk. Accordingly, the gimbal assembly 44 of the present invention comprises only the slider 16 and the flexure 14 having the dimple 38 pivoting against the load beam 12. As mentioned before and repeated herein, the design of the flexure 14 is of critical importance. Specifically, the flexure 14 must be fabricated to meet the criteria set forth above.

FIG. 5 shows the flexure 14 isolated from the other components. The flexure 14 includes a mid section 47 disposed between a proximate end section 49 and a distal end section 51. The mid section 47 decreases in width toward the end sections 49 and 51. The flexure 14 also assumes a truss shape which includes a plurality of cutouts defining a plurality of strut members. For example, in this embodiment, there are a pair of diamond-shaped, side cutouts 52 and 54, a primary cutout 56 and a stiffness adjustment cutout 58. Between the side cutout 52 and the primary cutout 56 is an internal strut member 60. Similarly, between the side cutout 54 and the primary cutout 56 is another internal strut member 62. Likewise, side cutouts 52, 54 and the stiffness adjustment cutout 58 define internal strut members 64 and 66, respectively. Side cutouts 52 and 54 and the boundary of the flexure 14 also define a pair of boundary strut members 68 and 70, respectively. As shown, all strut members are generally elongated in shape and having substantially uniform widths.

In this embodiment, the flexure 14 is generally symmetrical about a central axis 72 passing from the proximate end section 49 to the distal end section 51. The strut members are positioned angularly with respect to the central line 72.

The truss shape of the flexure 14 offers many advantages not available in most prior art gimbal assemblies. To begin with, without any part of the flexure 14 in sizable area form, it needs less force to twist the flexure 14. That is, the roll stiffness, Rx, of the flexure 14 is substantially reduced. For the same reasons, the pitch stiffness Ry, of the flexure 14 is also diminished. The z-stiffness Tz, is also accordingly eased as the hollowed-out shape of the flexure 12 offers less resistance in its movement in the z direction. However, the other parameters, the y-stiffness Ty, the x-stiffness Tx, and the yaw stiffness Rz, are not at all compromised.

Take the most vulnerable parameter, the y-stiffness Ty, as an illustration. Rapid movements of the actuator arm 8 during data seeking can very well deform the flexure 14 if it does not have a high Ty. A deformed flexure, even slightly, would be prone to resonate at a lower frequency and is detrimental to the performance of the magnetic head. With the flexure 14 of the present invention, the wider mid section 47 in comparison to the end sections 49 and 51 provides enough stiffness to withstand the rapid acceleration of the actuator arm 8. The cutouts in the flexure 14 do not affect the y-stiffness very much as the strut members perform the balancing act of compression and extension to maintain the lateral rigidity.

The other parameters, the x-stiffness Tx, and the yaw stiffness Rz, are not as important as the above discussed parameters in the design of a gimbal. For example, during takeoff and landing, the slider 16 experiences long periods of acceleration and deceleration. The translational force exerted on the flexure 14 in the x direction is consequentially negligible. Likewise, operated inside the protective housing, there is no external force to cause the slider to yaw. Therefore the parameters x-stiffness Tx, and the yaw stiffness Rz, need no further elaboration.

Extensive measurements and simulations have been conducted to evaluate the performance of the invention. It should be noted that the inventive gimbal is suitable for use with highly miniaturized suspension arrangements. Therefore absolute values are of no significant meaning in comparing with the prior art counterparts which are larger in physical dimension and mass. Instead, normalized ratios are utilized to gauge the performance. The flexure of the present invention is compared with two other flexures. One is modeled after Yumura. The second flexure is from the copending referenced application. The results are charted in the following table:

|  | Yumura | 08/161,168 | Invention |
| --- | --- | --- | --- |
| y-stiffness | 13.4 N/mm | 13.0 N/mm | 9.3 N/m |
| y-stiffness to pitch stiffness | 13.4/9.22 = 1.45 | 13.0/3.6 = 3.61 | 9.3/1.71 = 5.44 |
| y-stiffness to roll stiffness | 13.4/15.78 = 0.85 | 13.0/2.70 = 4.82 | 9.3/1.62 = 5.74 |
| pitch stiffness to roll stiffness | 9.22/15.78 = 0.58 | 3.60/2.70 = 1.33 | 1.71/1.62 = 1.06 |

As can be seen from the table, the y-stiffness in absolute value is lower due to the smaller size of the inventive flexure. However, as mentioned before, slider masses are much less in newer generations of disk drives. Therefore, the burden placed on this parameter is accordingly less stringent. There are however substantial improvements in the invention regarding the parameters of roll and pitch stiffness as compared to the y-stiffness. That is, for a flexure of a fixed stiffness, adopting the design of the present invention, the corresponding gimbal assembly is more dynamically agile to adapt to the topographical changes of the magnetic disk surfaces.

It should be understood that other variations are possible within the scope of the invention. For example, the stiffness adjustment cutout 58 can be entirely eliminated, and the gimbal assembly 44 can still substantially maintain its performance. The overall shape of the flexure 14 needs not be rectilinear. Various other shapes can also be used.

What is claimed is:

1. A gimbal assembly of a magnetic head suspension comprising:

a polygon shaped flexure having a midsection, a proximate end section and a distal end section, said midsection decreasing in dimension toward said end sections, said flexure being symmetrical about a central axis passing from said proximate end section to said distal end section; and a pair of diamond-shaped cutouts formed in said midsection of said flexure, each of said cutouts being formed between an internal strut member and an external strut member, each of said strut members being elongated in shape, having a substantially uniform width, and angularly disposed with respect to said central axis.

2. The gimbal assembly as set forth in claim 1 wherein said flexure includes a stiffness adjustment cutout formed in said proximal end section.

3. The gimbal assembly as set forth in claim 1 wherein said flexure includes a primary cutout formed in said distal end section.

4. The gimbal assembly as set forth in claim 3 wherein said flexure includes a finger portion formed at the distal end section of said flexure, said finger portion extending into said primary cutout.

5. The gimbal assembly as set forth in claim 4 including a dimple formed in said finger portion, an air bearing slider joined to said finger portion of said flexure, said dimple being formed for pivoting said air bearing slider attached to said finger portion.

6. The gimbal assembly as set forth in claim 5 wherein said flexure includes a stiffness adjustment cutout formed in said proximal end section.

7. The gimbal assembly as set forth in claim 6 comprising a load beam attached to the proximate end of said flexure.

\* \* \* \* \*